(No Model.)
J. J. SCHOLFIELD.
BEVEL GEAR FOR ROVING FRAMES.
No. 596,947. Patented Jan. 4, 1898.
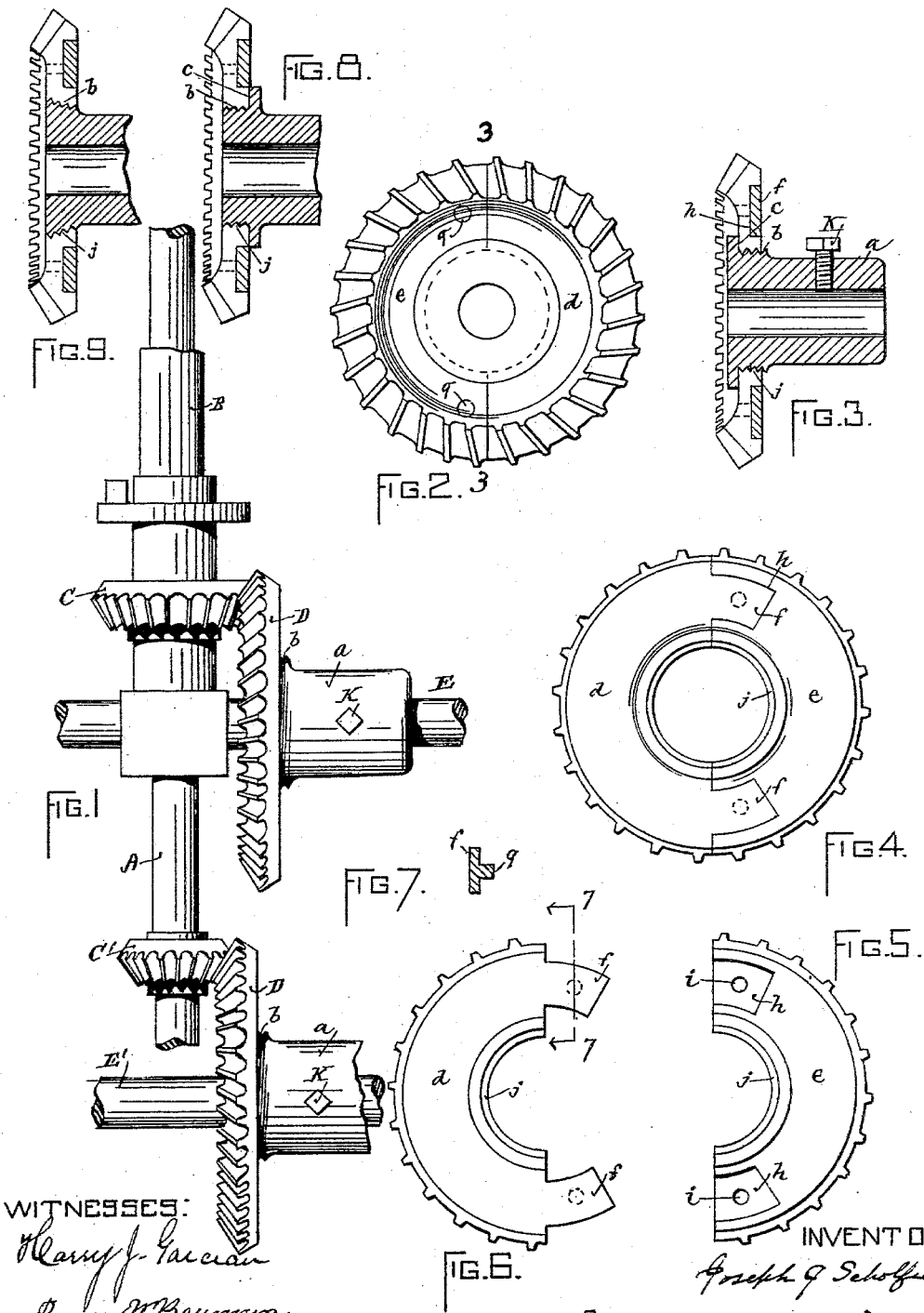

UNITED STATES PATENT OFFICE.

JOSEPH J. SCHOLFIELD, OF PROVIDENCE, RHODE ISLAND.

BEVEL-GEAR FOR ROVING-FRAMES.

SPECIFICATION forming part of Letters Patent No. 596,947, dated January 4, 1898.

Application filed May 18, 1896. Serial No. 592,054. (No model.)

*To all whom it may concern:*

Be it known that I, JOSEPH J. SCHOLFIELD, a citizen of the United States, residing at Providence, in the State of Rhode Island, have invented a new and useful Improvement in Bevel-Gears for Roving-Frames, of which the following is a specification.

On account of the very rapid wear of the teeth of the bevel-gears employed either to drive the bobbin-gear or the flier-spindle in roving-frames it is highly desirable to have the driving-gear made in separable parts in order to be able to repair a worn-out gear without requiring the removal from the machine of the driving-shaft and all of the attached driving-gears; and my invention consists in the improved construction and arrangement of the separable parts of the driving bevel-gear, as hereinafter fully set forth.

In the accompanying drawings, Figure 1 represents an edge view of the bevel-gear for driving the bobbin-gear and also of the gear for driving the spindle in a roving-frame. Fig. 2 represents a face view of the driving bevel-gear made in separable parts. Fig. 3 represents a vertical section taken in the line 3 3 of Fig. 2. Fig. 4 represents a back view of the separable segments of the gear without the hub. Figs. 5 and 6 represent a back view of the separable segments of the gear detached from each other. Fig. 7 represents a section taken in the line 7 7 of Fig. 6. Figs. 8 and 9 represent modifications.

In the drawings, A represents the spindle for supporting a flier, and B the bolster for supporting the pinion bobbin-gear C and the spindle A, the bobbin-gear C being driven by means of the separable driving-gear D, secured to the shaft E, the spindle A being driven by means of another separable driving-gear D, secured to the shaft E' and engaging with the pinion C' upon the spindle.

The hub $a$ of the gear D is permanently held upon the shaft E by means of the set-screw K, the said hub being made in one piece and provided with the external screw-thread $b$ and the limiting-shoulder $c$. The toothed segments $d$ and $e$ of the gear are adapted to interlock with each other, the segment $d$ being provided with the projecting lips $f\,f$, which at their inner sides are preferably provided with the studs $q$, and the segment $e$ is provided at its back with the recesses $h$, adapted to receive and fit the lips $f\,f$ of the segment $d$, and with the perforations $i$, which are adapted to receive the studs $q$ to hold the segments properly to each other. The segments $d$ and $e$ are provided with an interior screw-thread $j$, adapted to fit the screw-thread $b$ of the hub $a$, so that when the segments are screwed upon the hub, as shown in Figs. 1, 2, and 3, the said segments will be held in proper position by the screw-thread $b$ and the shoulder $c$ of the hub. By constructing the hub so that the segments $d$ and $e$ are to be screwed up in a direction toward the pinion bobbin-gear C, the required change of parts can be effected without changing the position of the hub $a$ upon the shaft E or loosening the same thereon, which is a great advantage and saving of time in adjustment. When the teeth of the gear have become worn out or broken, the segments can be unscrewed from the permanently-set hub $a$ and new segments secured in their places, and when the screw-threaded portion of the hub $a$ is made tapering, as shown in Fig. 8, the shoulder $c$ may be dispensed with, the tapering form of the hub serving as a shoulder to limit the onward movement of the interlocked segments $d$ and $e$ at the required position on the hub for the engagement of their teeth at the proper depth with the teeth of the gear C without requiring the loosening of the hub from its set position on the shaft.

It is evident that the segments $d$ and $e$ will be interlocked with each other by the hook-formed construction of the lips $f\,f$ and the recesses $h\,h$, so that when so constructed the studs $q$ may be dispensed with.

A modification is shown in Fig. 9, which shows a hub $a$, provided with a screw-thread $b$, adapted to receive the interlocked segments from the front end of the hub instead of the rear, as shown in Fig. 3.

I claim as my invention—

1. The combination of a solid hub provided with an external screw-thread, and the set-screw for attaching the hub to the shaft in a fixed position, with the interlocked gear-segments, provided with an internal screw-thread, which engages with the screw-thread of the hub, and means for limiting the onward screw movement of the segments upon the fixed hub at the proper position for driving engagement with the teeth of the pinion, substantially as described.

2. The combination of the solid hub provided with an external screw-thread, and the set-screw for attaching the hub to the shaft in a fixed position, with the interlocked gear-segments provided with an internal screw-thread which engages with the screw-thread of the hub, and screws thereon toward the pinion, to the proper limiting-point for driving engagement therewith, substantially as described.

JOSEPH J. SCHOLFIELD.

Witnesses:
 SOCRATES SCHOLFIELD,
 HARRY J. GARCEAU.